A. ROESCH.
RECORDER.
APPLICATION FILED AUG. 28, 1920.

1,380,417.

Patented June 7, 1921.

3 SHEETS—SHEET 1.

Inventor
Alfred Roesch
By his Attorneys

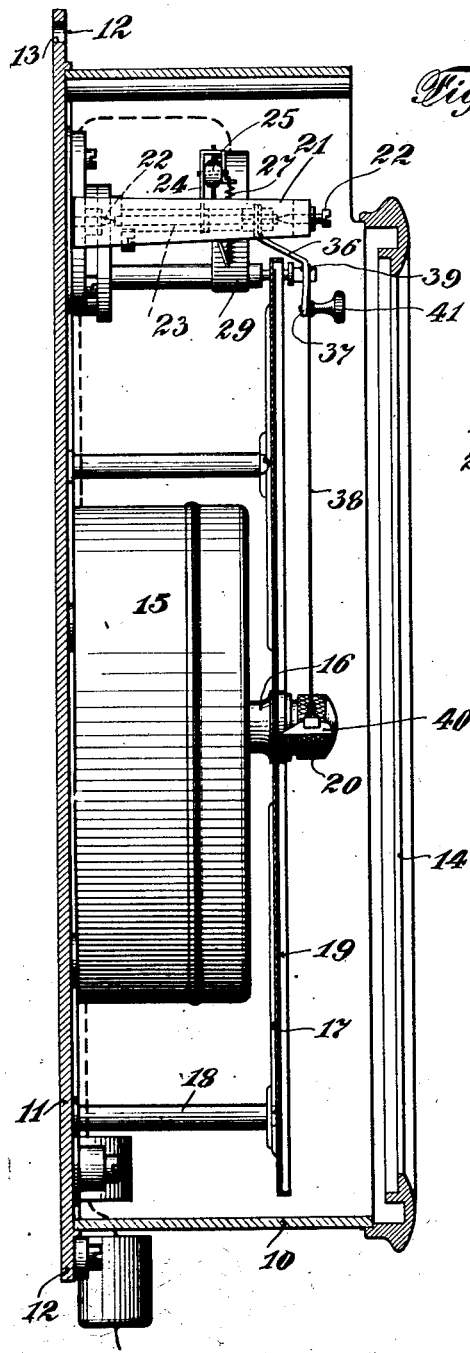
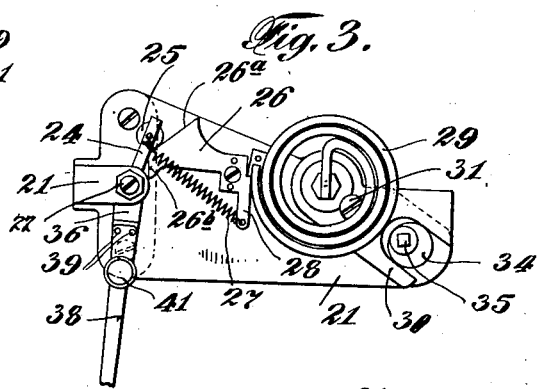
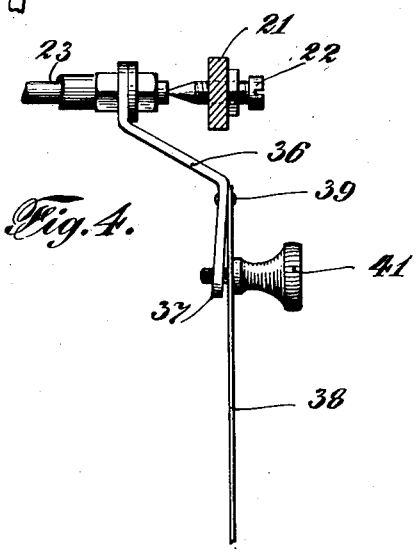

A. ROESCH.
RECORDER.
APPLICATION FILED AUG. 28, 1920.

1,380,417.

Patented June 7, 1921.
3 SHEETS—SHEET 3.

INVENTOR
Alfred Roesch
BY
Bresen Schrenk
ATTORNEYS

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

RECORDER.

1,380,417.  Specification of Letters Patent.  Patented June 7, 1921.

Application filed August 28, 1920. Serial No. 406,740.

*To all whom it may concern:*

Be it known that I, ALFRED ROESCH, a citizen of the United States, and resident of the borough of Brooklyn, county of Kings, city and State of New York, have invented certain new and useful Improvements in Recorders, of which the following is a specification.

My invention relates to recorders and more particularly to that type of such instruments which are intended to indicate and record temperatures and has for its object to provide a simplified construction whereby the efficiency of the instrument is increased to a maximum extent. Other more specific objects of the invention will appear from the description hereinafter and the features of novelty will be pointed out in the appended claims.

Figure 1:
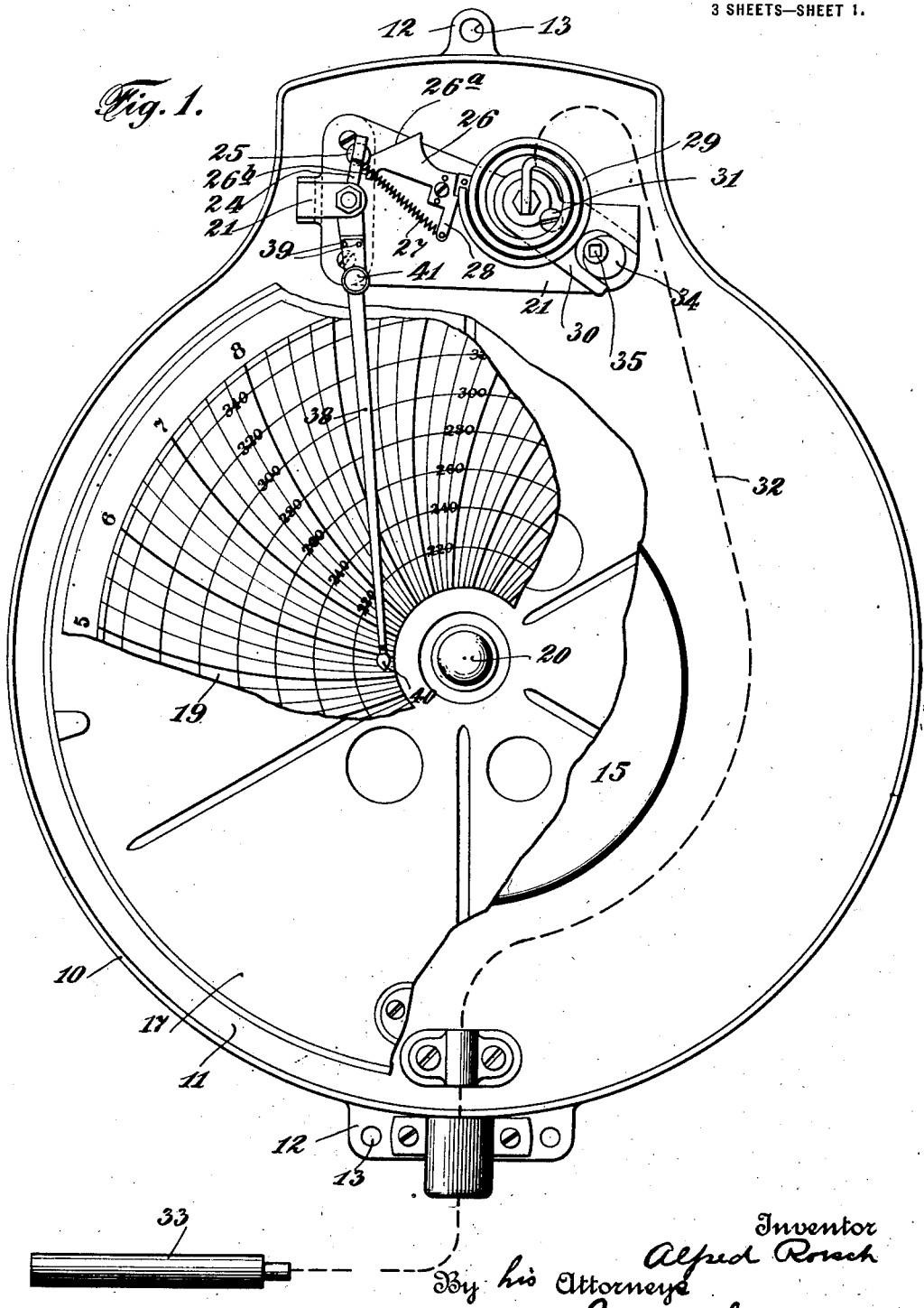
Figure 5:
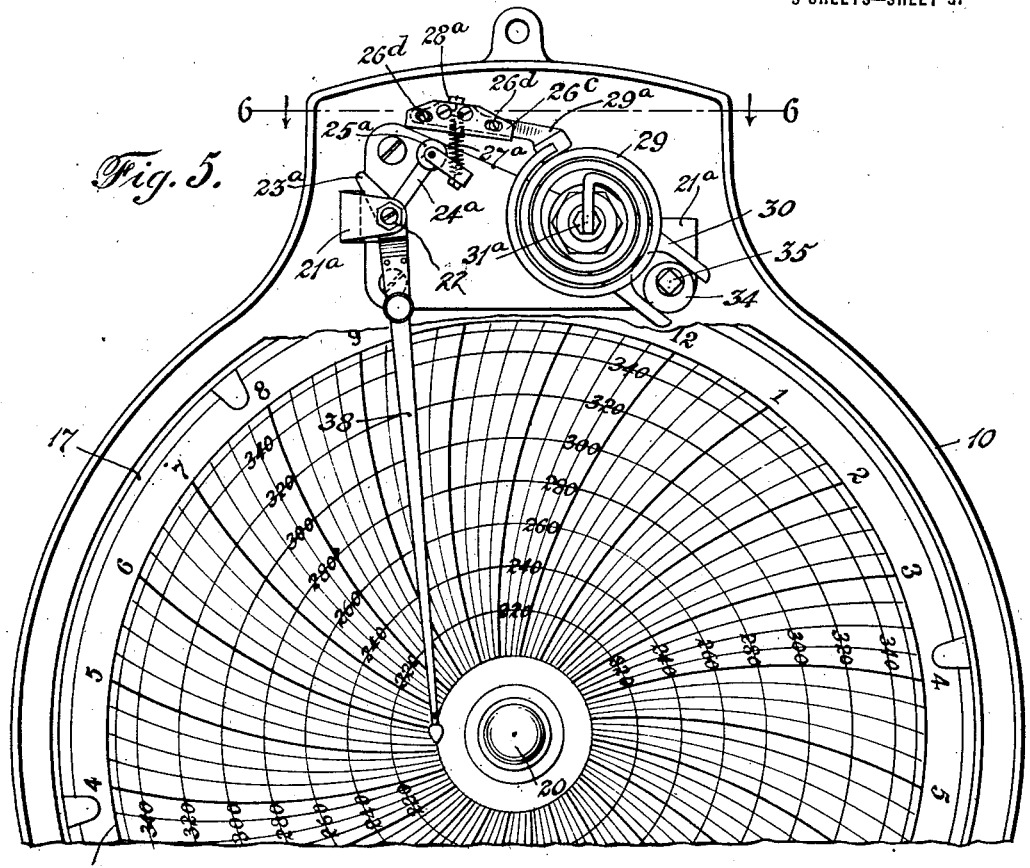
Figure 6:
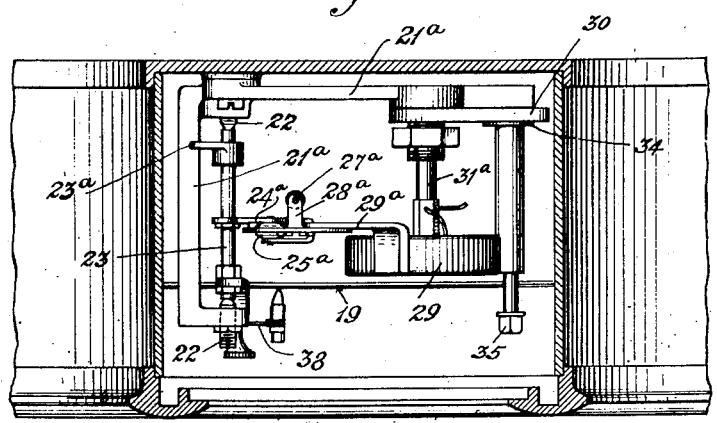

In the accompanying drawings, which illustrate several examples of the invention without defining its limits, Figure 1 is a face view of the recorder with parts broken away; Fig. 2 is a longitudinal section on the line 2—2 of Fig. 1; Figs. 3 and 4 are detail front and side views respectively showing the pen arm mounting; Fig. 5 is a fragmentary face view of another form of the invention, and Fig. 6 is a detail section thereof on the line 6—6 of Fig. 5.

As shown in the illustrated examples, the instrument comprises a casing 10 of any suitable construction and arrangement, mounted upon or carried by a back plate 11 which is provided with lugs 12 having suitable apertures 13 for the accommodation of screws or other fastening devices whereby the instrument may be secured upon any convenient support. The front of the casing 10, as shown, may comprise a cover 14 which is preferably movable relatively to said casing, either by being hinged thereon or otherwise movably connected therewith. Within the casing 10 is located the customary clockwork 15, the spindle 16 of which projects through a disk 17 carried by supports 18 suitably secured upon the back plate 11. The disk 17 serves as a support for the customary chart 19 which is mounted upon the spindle 16 and fastened thereon by means of the nut 20, whereby said chart is rotatably driven by the clockwork 15 in the well known way. As so far described the instrument may comprise any well known construction.

In the form of construction shown in Figs. 1 to 4 inclusive a bracket 21 is secured at a proper point in the casing 10 and is provided with axially alining bearings 22 between which a shaft 23 is journaled, one of said bearings preferably being adjustable as shown in Fig. 2. An arm 24 is secured upon and projects from said shaft 23 and carries a roller 25 which is maintained in constant engagement with a cam 26 by means of a spring 27, the one end of which is connected with said arm and the other end of which is fastened to a projection 28 extending from the cam member 26, as illustrated in Fig. 1. The cam 26 in the form shown in Figs. 1, 2 and 3 is provided with an inclined surface 26$^a$ and a continuing surface 26$^b$ preferably comprising an arc of a circle having the pivot 31, hereinafter referred to, as a center and is secured to one end of a sensitive coil 29 so as to be carried directly thereby, said coil being mounted upon a carrier 30, which is shown in the form of a flat plate and is pivoted at 31 upon the bracket 21; the coil 29 is connected by means of a capillary tube 32 with a sensitive member 33 in the form of a bulb which is intended to be located in the zone or at the point, the temperature changes of which are to be indicated and recorded.

For the purposes of adjustment, as will be more fully pointed out hereinafter, the one end of the carrier 30 is forked and straddles an eccentric 34 rotatably mounted upon said bracket 21 and preferably having its pivot formed with a squared end 35 for the accommodation of a key or other suitable implement whereby said eccentric may be adjusted.

As shown in Fig. 2 a member 36 is secured upon the shaft 23 and extends therefrom at an incline toward the front of the casing, the free end 37 of said member preferably being straight and providing a support to which one end of the pen arm 38 is secured, for instance, by rivets 39. The pen arm 38 at its free end carries the customary stylus 40 and is preferably constructed of resilient material having an inherent tension exerted in a direction away from the chart 19. For the purpose of adjusting the tension or pressure of the stylus 40 upon said chart to permit said stylus to move freely over the same and to prevent lag or sticking whereby uniform tracing free from blurs, is obtained, I prefer to provide an adjusting device which in the illustrated example takes the form of a set screw 41 screwing into the end 37 of the member 36 and bears against the pen arm 38 as shown in Figs. 3 and 4; in carrying out this arrangement, the free end 37 and the pen arm 38 preferably bear an inclined relation to each other, for instance, as shown in Fig. 4.

The instrument is operated in the customary manner by the expansion and contraction of the fluid in the bulb 33 due to temperature changes at the point or in the zone where said bulb is located. As a result of the aforesaid contraction and expansion the coil 29 is actuated and brings about an actuation of the cam 26 which in turn, by reason of the action of the surface 26$^a$ upon the roller 25, swings the arms 24 and rocks the shaft 23. In this manner the pen arm 38 is operated relatively to the chart 19 to cause the stylus 39 to trace a record thereon, it being understood that said chart is rotated by the clockwork 15 when the instrument is in operation.

By rotatably shifting the eccentric 34, the carrier 30 is pivotally adjusted and with it the coil 29 and cam 26 whereby the initial position of the latter with respect to the roller 25 is changed; in this way the operative throw of the stylus 39 is adjusted so as to always properly coöperate with the chart 19. Because of the fact that the surface 26$^b$ of the cam 26 is curved in an arc having as a center the pivot 31 about which the carrier 30 swings, the adjustment of the cam member 26 will have no effect to change the normal, initial position of the stylus 40 upon the chart 19. The parts are so proportioned and arranged that in said initial position the stylus 40 rests upon the innermost circle of the scale, to which position it automatically returns when the roller 25 rides upon the cam surface 26$^b$.

By properly manipulating the set screw 40 the pen arm 38 is pressed toward or permitted to move away from the chart 19 under its own tension, whereby the position of the stylus 39 is adjusted so that the line traced thereby will be uniform and free from blurs or other imperfections, the adjustment of the pen arm 38 being facilitated if the free end 37 of the member 36 and the upper end of the pen arm 38 are inclined with respect to each other, for instance, as shown in Fig. 4. It will be obvious that the set screw 40 may be replaced by other types of adjustment devices whereby the same results with regard to the adjustment of said stylus may be obtained. The proper adjustment of the pen arm is very important for if the pressure or tension is too great, the stylus will stick in the chart or lag and if too little, it will fail to produce a mark upon said chart. The present arrangement provides a very efficient means whereby this adjustment may be easily accomplished in a simple and reliable manner; the necessity for manually bending the pen arm as is now very often done and which produces very crude and unreliable results and reduces the life of said pen arm, is also avoided.

In the form shown in Figs. 5 and 6, which may be said to represent a preferred construction, the cam 26$^c$ is mounted upon a member 29$^a$ preferably in a manner so as to be adjustable relatively thereto, as, for instance, by means of slots and screws 26$^d$. The member 29$^a$ is attached to the sensitive coil 29 so that in this form, as in the form previously described, the cam 26$^c$ is carried directly by said coil, which may be mounted upon a carrier 30 also in the form of a flat plate pivoted at 31$^a$ upon a bracket 21$^a$ corresponding to the bracket 21 hereinbefore referred to. As in the arrangement shown in Figs. 1 to 4 inclusive the one end of the carrier 30 may be forked for coöperation with an eccentric 34 which, as before, may be rotatable through the medium of an arbor having a squared end 35 for varying the initial, normal position of the cam 26$^c$.

In the form now being described, the cam 26$^c$ is located above the roller 25$^a$ which corresponds to the roller 25 and likewise is journaled upon an arm 24$^a$ secured upon and projecting radially outward from the shaft 23, from which the pen arm 38 depends as in the construction first described, the connection preferably being an adjustable one, for instance of the kind shown in Fig. 4. A coil spring 27$^a$ has its one end secured to the arm 24$^a$ and its other end connected with a projection 28$^a$ extending from the member 29$^a$ and exerts a tension tending to draw the roller 25$^a$ and cam 26$^c$ toward each other. In addition to the parts so far described the construction shown in Figs. 5 and 6 includes a lever 23$^a$ fixed upon the shaft 23 and projecting radially outward therefrom for engagement with a contiguous portion of the bracket 21. The lever 23$^a$ is set so as to engage the bracket 21 when the stylus is in registry with the innermost or any other predetermined circle or other designation of the scale on the chart 19 and constitutes a stop whereby the return movement of the pen arm 38 is automatically arrested when the stylus has reached its initial position. The action of said stop 23$^a$ is positive and without regard to any normal position which the cam 26$^c$ may finally assume and positively prevents the stylus from passing inwardly beyond the innermost circle of the chart scale or coming to rest inwardly beyond its predetermined normal position. In all other respects the construction may be the same as previously described. When constructed as in Figs. 5 and 6, the instrument may also be operated in the customary manner by the expansion and contraction of the fluid in the bulb 33 due to temperature changes at the point or in the zone where said bulb is located. As a result of the aforesaid expansion, the coil 29 is actuated and brings about an actuation of the arm 29ª and cam 26ᶜ which causes the latter to exert a downward pressure upon the roller 25ª and thereby swings the arm 24ª and rocks the shaft 23. In this manner the pen arm 38 is operated relatively to the chart 19 to cause the stylus 39 to trace a record thereon, it being understood that said chart is rotated by the clockwork 15 when the instrument is in operation.

It will be noted that the action of the cam 26ᶜ upon the roller 23ª in a direction to swing the pen arm 38 toward the left in Fig. 5, is a direct and positive operation in which the spring 27ª plays no direct part. The latter serves to swing the pen arm 38 in a return movement as the cam 26ᶜ moves in a direction away from the roller 25ª because of the contraction of the coil 29, due to a reduction in temperature at the sensitive member or bulb 33. This return movement, as previously stated, is positively arrested when the lever 23ª contacts with the bracket 21, this being so regardless of any continued movement of the cam 26ᶜ in a return direction; in other words, the position of rest which the cam finally assumes may be at a distance from the roller 25ª as shown, for instance, in Fig. 5, without affecting the position finally assumed by the stylus 40, which is always in registry with the innermost circle of the chart scale or some other predetermined point thereon.

The arrangement and construction shown in Fig. 5 is extremely efficient in action and positive in operation and predetermines the initial position of the stylus with exactitude and without regard, for instance, to any physical changes which may take place in the coil 29, such as stretching from long continued use, and also without regard to any adjustment of the pen arm 38. This makes it possible to accurately determine the starting point of the stylus and makes the instrument very reliable and uniform in action.

The construction, in all of the forms described, reduces the recorder to an extremely simple form which is efficient and reliable in operation and in which the parts, because of their simplicity, are not likely to become disarranged or damaged. The impositive connection between the pen arm and the sensitive cam member, in both constructions illustrated and described, provides a flexibility in these elements which contributes materially to the efficiency of the instrument.

Various changes in the specific form shown and described may be made within the scope of the claims without departing from the spirit of my invention.

I claim:

1. A recorder comprising a casing, a movable chart therein, a pen arm movably mounted in said casing in operative relation to said chart, a device in said casing sensitive to temperature changes and a cam mounted upon said sensitive device and partaking bodily of the movements thereof, said cam having an active surface adapted to cause a movement of said pen arm relatively to said chart.

2. A recorder comprising a casing, a movable chart therein, a rock-shaft mounted in said casing, a pen arm carried by said shaft in operative relation to said chart, an arm secured upon said shaft, a sensitive coil in in said casing, and a cam mounted upon said coil and partaking bodily of the movements thereof, said cam having an active surface adapted by contact with said arm to cause said pen arm to be actuated relatively to said chart.

3. A recorder comprising a casing, a movable chart therein, a rock-shaft mounted in said casing, a pen arm carried by said shaft in operative relation to said chart, an arm secured upon said shaft, a sensitive coil in said casing, a cam mounted upon said coil and partaking bodily of the movements thereof, said cam having an active surface adapted by contact with said arm to cause said pen arm to be actuated relatively to said chart, and means whereby said coil is adjusted to change the relation of said cam to said arm and thereby vary the operative throw of said pen arm relatively to the indications on said chart.

4. A recorder comprising a casing, a movable chart therein, a rock-shaft mounted in said casing, a pen arm carried by said shaft in operative relation to said chart, an arm secured upon said shaft, a carrier pivotally mounted in said casing, a sensitive coil carried by said carrier, a cam mounted upon said coil and partaking bodily of the movements thereof, said cam having an active surface adapted to contact with said arm to cause said pen arm to be actuated relatively to said chart and an eccentric whereby said coil is shifted to change the relation of said cam to said arm and thereby vary the operative throw of said pen arm relatively to the indications on said chart.

5. A recorder comprising a casing, a movable chart therein, a rock-shaft mounted in said casing, a pen arm carried by said shaft in operative relation to said chart, an arm secured upon said shaft, a roller journaled upon said arm, a sensitive coil in said casing, a cam mounted upon said coil and partaking bodily of the movements thereof to cause a movement of said arm whereby said pen arm is actuated relatively to said chart, and a spring whereby said roller and cam are drawn one toward the other.

6. A recorder comprising a casing, a movable chart therein, a pen arm movably mounted in said casing in operative relation to said chart, a device in said casing sensitive to temperature changes and a cam adjustably mounted upon said sensitive device and partaking bodily of the movements thereof to actuate said pen arm relatively to said chart.

7. A recorder comprising a casing, a movable chart therein, a pen arm movably mounted in said casing in operative relation to said chart, a device in said casing sensitive to temperature changes, a cam mounted upon said sensitive device and partaking bodily of the movements thereof to actuate said pen arm relatively to said chart, and means whereby the return movement of said pen arm is positively arrested at a predetermined point without regard to the position of rest finally assumed by said cam.

8. A recorder comprising a casing, a movable chart therein, a rock-shaft mounted in said casing, a pen arm carried by said shaft in operative relation to said chart, an arm secured upon said shaft, a sensitive coil in said casing, an arm carried by said coil, and a cam adjustably mounted upon said arm, and partaking bodily of the movements of said cam to impart its movements to said arm whereby said pen arm is actuated relatively to said chart.

9. A recorder comprising a casing, a movable chart therein, a rock-shaft mounted in said casing, a pen arm carried by said shaft in operative relation to said chart, an arm secured upon said shaft, a sensitive coil in said casing, a cam mounted upon said coil and partaking bodily of the movements thereof to impart its movements to said arm whereby said pen arm is actuated relatively to said chart, and a lever fixed upon said shaft and arranged to engage a contiguous portion of said recorder to positively arrest the return movement of said pen arm at a predetermined point with regard to the position of rest finally assumed by said cam.

10. A recorder comprising a casing, a movable chart therein, a bracket in said casing, a rock-shaft mounted on said bracket, a pen arm carried by said shaft in operative relation to said chart, an arm secured upon said shaft, a carrier pivotally mounted in said casing, a sensitive coil mounted upon said carrier, a cam carried by said coil and partaking bodily of the movements thereof to impart its movements to said arm whereby said pen arm is actuated relatively to said chart, a lever fixed upon said shaft and arranged to engage said bracket to positively arrest the return movement of said pen arm at a predetermined point without regard to the position of rest finally assumed by said cam, and an eccentric whereby said carrier is adjusted to change the location of said coil and cam member to vary the operative throw of said pen arm.

In testimony whereof I have hereunto set my hand.

ALFRED ROESCH.